UNITED STATES PATENT OFFICE.

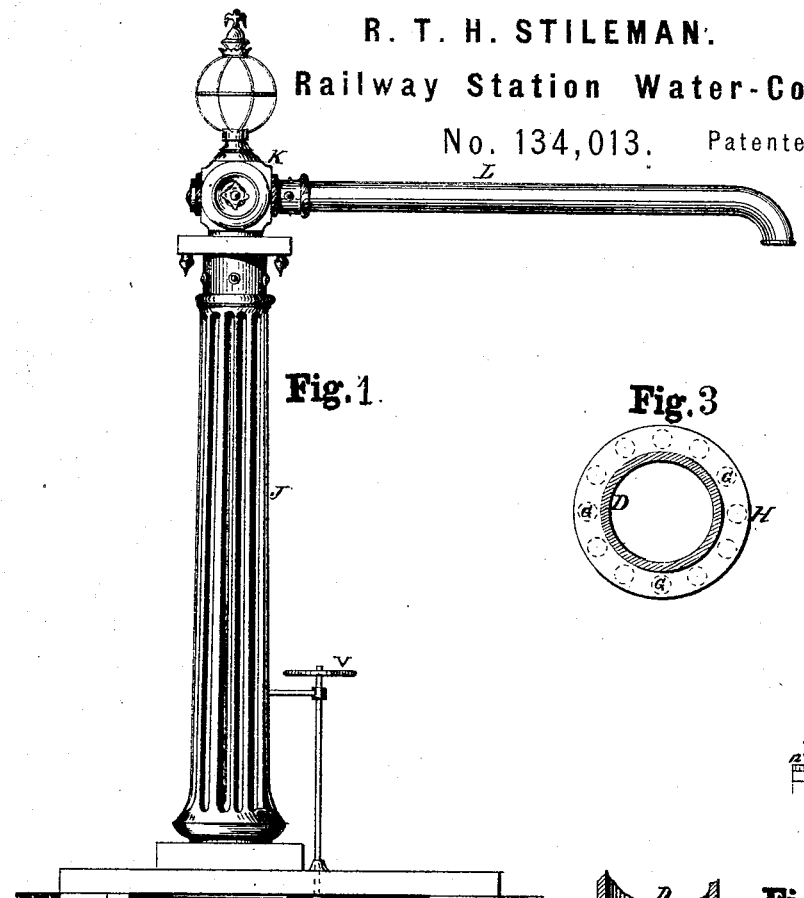
R. T. H. STILEMAN.
Railway Station Water-Column.
No. 134,013. Patented Dec. 17, 1872.
Fig. 1.
Fig. 3.
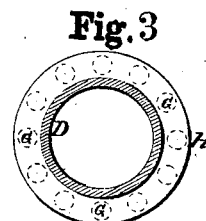
Scale for Figs 2 & 3
Fig. 2.
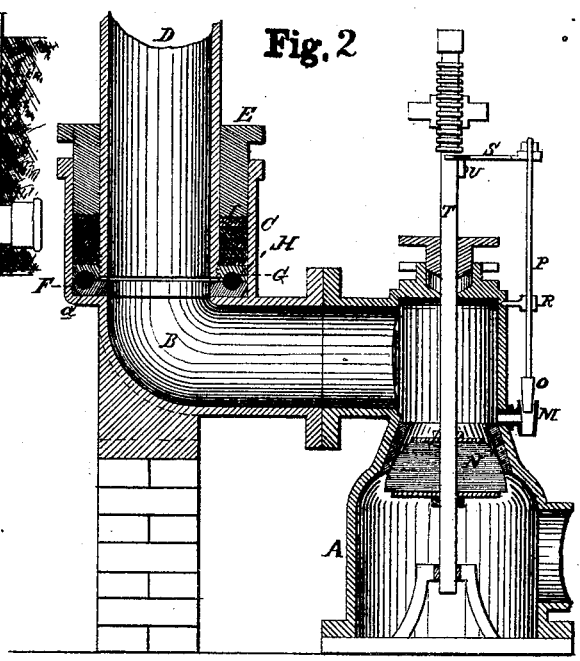
WITNESSES.
James F. Stileman
Isaac R. Oakford
INVENTOR.
Richard T. H. Stileman

RICHARD T. H. STILEMAN, OF PHILADELPHIA, PENNSYLVANIA.

IMPROVEMENT IN RAILWAY-STATION WATER-COLUMNS.

Specification forming part of Letters Patent No. 134,013, dated December 17, 1872.

*To all whom it may concern:*

Be it known that I, RICHARD T. H. STILEMAN, of the city and county of Philadelphia, State of Pennsylvania, have invented certain Improvements in Railway - Station Water-Column, of which the following is a specification:

This invention relates to certain improvements in the hydraulic pipe or column erected at different points on the line of railways, and provided with a swinging arm for replenishing the locomotive-tender; and my invention consists in supporting the perpendicular pipe to which the swinging arm is attached, and through which the water flows, upon an anti-friction bearing, thereby permitting it (the arm) to be swung with greater ease in any desired position.

Figure 1 is a side elevation of my improvements in railway-station water-columns. Fig. 2 is a vertical section of the lower portion of same, showing the swing-joint, and also the arrangement of the waste-water cock. Fig. 3 is a plan view of the anti-friction bearing.

The casing A of the station-plug is made in the form as shown in the drawing, and is provided on one side and near the upper end with an elbow, B, the vertical end of which is made of an increased area, and forms a stuffing-box, C, for the reception of the flange on the lower end of the perpendicular pipe D. The stuffing-box C, in which the swing-joint is made, is provided with a suitable gland, E, and has fitted and resting upon the shoulder *a*, formed within it, a flat ring, F, Fig. 2, the upper surface of which is provided with a circular concave channel, in which the anti-friction balls G G are placed. The flange H, on the lower end of the perpendicular pipe D has a corresponding channel formed in it, and rests upon the balls or spheres, thus forming an anti-friction bearing, and permitting the pipe to revolve freely. The pipe D, supported on the anti-friction bearing, as above described, and made perfectly water-tight within the stuffing-box, by means of the packing I, passes up through the center of the fluted column J and connects with an ornamental head, K, placed on the cap of the column, from which a swinging arm, L, projects, as shown in Fig. 1. The body of the waste-water cock M is attached to the side of the casing A, directly above the valve N, so that the opening in the shank will be on a line with the top of the valve when closed. The plug O of the said cock is provided with a long stem, P, which passes up through a guide, R, secured to the casing A, and has attached to the upper end an arm, S, the outer end of which is made in the form of a yoke, which embraces the valve-stem T, and rests upon a cross-piece, U, Fig. 2. The valve-stem T is provided with a screw-thread, and is operated from the hand-wheel V, and the stem P of the plug O is so adjusted as to move simultaneous with it, so that when the valve N is drawn upward and closed on its seat the plug O is at the same time drawn upward and opens the orifice in the cock M, thus permitting the water remaining in the elbow and pipe D to flow out. The stem P may be readily disconnected, and the cock M kept continually closed when there is no liability of the water freezing within the pipe.

What I claim as my invention is—

The perpendicular pipe D, flanges H and F, and balls G G, in combination with the stuffing-box C, elbow B, and plug A, whereby I am enabled to support the column on an anti-friction bearing.

RICHARD T. H. STILEMAN.

Witnesses:
JAMES F. STILEMAN,
ISAAC R. OAKFORD.